United States Patent
Farell et al.

(10) Patent No.: US 8,494,365 B2
(45) Date of Patent: Jul. 23, 2013

(54) RANDOM GAP INSERTION IN AN OPTICAL RING NETWORK

(75) Inventors: Tom Farell, Dublin (IE); Shane O'Neill, Dublin (IE)

(73) Assignee: Intune Networks Limited, Dublin (IE)

( * ) Notice: Subject to any disclaimer, the term of this patent is extended or adjusted under 35 U.S.C. 154(b) by 0 days.

(21) Appl. No.: 13/637,750

(22) PCT Filed: Mar. 29, 2011

(86) PCT No.: PCT/EP2011/054846
§ 371 (c)(1),
(2), (4) Date: Jan. 10, 2013

(87) PCT Pub. No.: WO2011/120978
PCT Pub. Date: Oct. 6, 2011

(65) Prior Publication Data
US 2013/0114958 A1    May 9, 2013

Related U.S. Application Data

(60) Provisional application No. 61/318,643, filed on Mar. 29, 2010.

(30) Foreign Application Priority Data

Mar. 29, 2010 (EP) .................... 10158220

(51) Int. Cl.
*H04B 10/00* (2006.01)
(52) U.S. Cl.
USPC .................. 398/59; 398/58; 398/83
(58) Field of Classification Search
USPC ............................. 398/58, 59, 83
See application file for complete search history.

(56) References Cited

U.S. PATENT DOCUMENTS

| | | | | |
|---|---|---|---|---|
| 4,450,554 A | * | 5/1984 | Steensma et al. | 398/54 |
| 5,208,693 A | * | 5/1993 | Arstein et al. | 398/100 |
| 5,390,181 A | * | 2/1995 | Campbell et al. | 370/444 |
| 5,412,498 A | * | 5/1995 | Arstein et al. | 398/202 |
| 5,530,575 A | * | 6/1996 | Acampora et al. | 398/58 |
| 5,864,415 A | * | 1/1999 | Williams et al. | 398/72 |
| 6,078,568 A | * | 6/2000 | Wright et al. | 370/312 |
| 6,240,083 B1 | * | 5/2001 | Wright et al. | 370/348 |
| 6,292,493 B1 | * | 9/2001 | Campbell et al. | 370/445 |
| 6,711,357 B1 | * | 3/2004 | Brewer et al. | 398/54 |
| 6,898,205 B1 | * | 5/2005 | Chaskar et al. | 370/450 |
| 7,382,739 B2 | * | 6/2008 | Kramer | 370/254 |
| 7,826,747 B2 | * | 11/2010 | Su et al. | 398/83 |
| 8,295,700 B2 | * | 10/2012 | Shields et al. | 398/51 |

(Continued)

FOREIGN PATENT DOCUMENTS

EP    1759558    3/2007
WO    WO02/37758    5/2002

*Primary Examiner* — Agustin Bello
(74) *Attorney, Agent, or Firm* — Occhiuti Rohlicek & Tsao LLP

(57) ABSTRACT

The invention provides a burst transmission optical fiber wavelength routed ring network and method comprising a plurality of nodes on a network ring where each node can drop and add a wavelength. The network has a control means to control the wavelength to be transmitted on the network ring in a burst transmit mode from each node over a scheduling interval. The invention provides a random generator for generating a plurality of gap intervals over the scheduling interval, such that the gap intervals allow for wavelengths from different nodes to transmit wavelengths in said gaps to achieve a fair access to bandwidth and fair latency in the ring network.

26 Claims, 6 Drawing Sheets

U.S. PATENT DOCUMENTS

| | | | |
|---|---|---|---|
| 8,301,867 B1* | 10/2012 | Mazuk et al. | 712/36 |
| 2002/0059408 A1* | 5/2002 | Pattabhiraman et al. | 709/223 |
| 2005/0084267 A1* | 4/2005 | Fan et al. | 398/84 |
| 2006/0198299 A1* | 9/2006 | Brzezinski et al. | 370/229 |
| 2007/0242625 A1* | 10/2007 | Dunne et al. | 370/258 |
| 2009/0142055 A1* | 6/2009 | Qiu et al. | 398/45 |

* cited by examiner

RANDOM GAP INSERTION IN AN OPTICAL RING NETWORK

CROSS-REFERENCE TO RELATED APPLICATIONS

This application is the National Stage of International Application No. PCT/EP2011/054846, filed on Mar. 29, 2011, which claims the priority of U.S. Provisional Application No. 61/318,643, filed on Mar. 29, 2010 and European Application 10158220.3, filed Mar. 29, 2010. The contents of both applications are hereby incorporated by reference in their entirety.

FIELD OF THE INVENTION

The invention relates to a telecommunications network. In general the invention relates to a control system and method to achieve fair access to bandwidth and fair latency between nodes that asynchronously share a transmission medium. In particular it relates to a control system and method to achieve fair access to bandwidth and fair latency between nodes through a fibre optic burst mode ring network.

BACKGROUND TO THE INVENTION

A typical instantiation of a fibre optic burst mode ring network uses tunable lasers at the ingress transmit side, where the laser is tuned to a specific wavelength that is received by a specific location on the ring. Optical filters are used to drop different wavelengths at different locations on the ring. In this type of network ingress network traffic with a common destination is formed into bursts which are transmitted at the correct wavelength to get the bursts and traffic contained within to their destination.

In such networks there is an inherent unfairness as the location which is furthest upstream from the destination has un-contended access to that destination and can block closer sources. The unfairness arises because no two sources can add a burst at the same wavelength such that the bursts appear at the same position in the optic fibre ring. If this was to occur, both bursts would be corrupted and the information contained within lost. To prevent this from happening, the closer nodes must ensure they do not transmit at the same time as an upstream node. To clarify, the terms "furthest" and "closer" do not relate to geographical distance. They refer to the nodes position in the topology of a unidirectional ring. The furthest node is the node that attaches to the ring at the point most upstream from the destination node. The closest node is the once that is adjacent to the destination node. To provide an everyday analogy to the problem, cars entering a ring road from a slipway can be blocked by cars already on the ring road.

In the fibre optic spans between nodes in the ring, each wavelength cannot interfere with other wavelengths but if two transmitters put optical bursts onto a fibre optic span at the same wavelength at the same time they will interfere and be corrupted such that they cannot be received at the receiver. This is termed a 'collision' and occurrences of collisions should be avoided as these bursts will not be received and the lost data will have to be retransmitted. To avoid collisions each node must only add bursts onto wavelengths which are not occupied by bursts from other nodes and this leads to contention such that if two nodes wish to send bursts to one destination then they cannot transmit at the same time.

The network requires that only one node on the network can add the same wavelength at any one time to avoid wavelength collisions, which will corrupt the data. A wavelength collision avoidance scheme is disclosed in European Patent Number EP 1 759 558, assigned to Intune Networks Limited. This collision avoidance scheme allows for each node in the network to monitor the number of wavelengths currently used in the network. A control unit continually monitors at a node all the wavelength transmit data in the network and then can then decide which wavelengths are available for access on the network and select an add wavelength for transmit on the network to enable access. As each node operates asynchronously from the other nodes on the network this functionality means that each node can operate independently and monitor the available wavelength independently without the need for central control. The receiving node then uses a messaging channel wavelength to send a back-off or push-back signal to all the nodes that are trying to send data to it. This back-off signal is received by all nodes trying to send data, and each of these nodes then reduces the amount of time it is trying to send data to that receiving node by means of a fairness algorithm. For example, it may back-off by 50% which means that it only tries to access that wavelength 50% of the time that it was previously trying to do this. A problem with this fairness approach is that it is not an efficient way to use the bandwidth or wavelengths in the ring network. This mechanism is also more complex in that it relies on coordinated control, that is, the sources must receive push back messages from the receivers in order to achieve fairness.

Other mechanisms of wavelength access control for burst mode optical ring networks includes scheduling of time slotted access in synchronous optical burst mode ring networks. For "slotted rings" every node on the ring needs to be tightly synchronised. An interval of time is then divided into slots for each wavelength and a centralised scheduler allocates each node access to specific slots in the wavelength. The scheduling can be distributed, however every node needs to make exactly the same decision therefore the scheduling still requires global communications and the same scheduling operation at each node as is made in the centralised version. This method of wavelength access control is very complicated both in maintaining synchronisation across the ring and in scheduling access.

There is therefore a need to provide a ring wide wavelength access control in a fair manner without the need for synchronisation, distributed information or complex scheduling operations.

SUMMARY OF THE INVENTION

According to the present invention there is provided, as set out in the appended claims, a burst transmission optical fibre wavelength routed ring network and method comprising a plurality of nodes on a network ring where each node can drop and add a wavelength. The network has a control means to control or manage the wavelengths accessed on the ring in a burst transmit mode from each node over an interval of time known as a scheduling interval. The invention provides a random generator for generating a plurality of gap intervals over the scheduling interval, such that the gap intervals allow for wavelengths from different nodes to transmit wavelengths in said gaps to achieve a fair access to bandwidth and fair latency in the ring network.

The present invention is a means to equalise the latency of, and provide throughput guarantees for, traffic flows on a burst optical network.

Any network will have preferential routes which can take precedence due to the topology of the network. The topology is defined by the geography of the connectivity to be achieved. The present invention provides a means to enable fairness in latency for different routes through the network and maintains that the throughput is fair also by use of random gap generator. The invention achieves fair access to bandwidth and fair latency through a fibre optic burst mode ring network by randomly scheduling burst access to the ring in a controllable manner by allocating random gaps randomly spread across the whole scheduling interval to allow different sources to transmit in the gap. This ensures fairness and also utilises the entire scheduling period where data can be dynamically transmitted, thus improving the overall latency of the network by reducing delay variation. Another advantage of the invention is that it does not require any source to coordinate with any other source or receiver.

In one embodiment, said random generator controls the insertion and size of said gaps for a wavelength by terminating bursts and preventing further transmission at the same wavelength for a determined time.

In one embodiment the random generator is configured to control the burst data and gap sizes to meet any allocation by randomly inserting gaps over the scheduling interval.

In one embodiment there is provided a random gap generator at each node, each generator off-set from each other, such that two different nodes for each scheduling interval in the network will never have the same random gap pattern for any wavelength.

In one embodiment said control means tracks the current data activity on all wavelengths and dynamically adjusts the gap insertion pattern to account for transmissions by upstream nodes at the same wavelength.

In one embodiment the random gap generator inserts gaps pseudo-randomly of various sizes into the transmission of bursts from each node in the ring.

In one embodiment sizes of the data bursts are modulated by said random gap generator to ensure the pathological traffic patterns are replaced with uniformly random patterns.

In one embodiment there is provided two random generators per node source-destination pair on the ring, a first random generator for data burst size and a second random generator for gap size.

In one embodiment the scheduling interval is the time taken to complete at least one PRBS cycle pseudo-random binary sequence.

In one embodiment the first random generator generates a first PRBS sequence for data and the second random generator generates a second PRBS sequence for gap size.

In one embodiment a Linear Feedback Shift Register generates a PRBS-8 bit pattern and used to generate the data/gap sizes for each burst stream leaving each node.

In one embodiment the PRBS-8 bit pattern is compared to a set of thresholds to produce a modulator, wherein the modulator is then added to an average block size parameter to create the required data/gap size.

In one embodiment there is provided means to change said PRBS seed for each scheduling interval.

In one embodiment there is provided means to ensure no two sources output the same combined sequence of data and gap sizes by ensuring RGIs at each node have differing data and gap PRBS seeds.

In one embodiment each of the nodes can add a burst of light at any wavelength and drops only one specific wavelength, such that any node can send data to any other node by selecting the required wavelength that is dropped by that node and transmitting a burst at that wavelength.

In one embodiment said burst is added onto the fibre optic ring and dropped at the destination node configured to drop that wavelength.

In one embodiment there is provided means for providing allocations across a scheduling interval, and adapted to compensate at a node for the behaviour of a downstream node for data interrupted by upstream data and using available gaps in the scheduling interval to transmit data. If data is blocked at the node said means may carry the allocations and random gap availability until the next available gap.

In one embodiment said carry of allocations can include carrying allocations across to the next scheduling interval.

In one embodiment the random generator allows for a deterministic amount of data and gap to be generated in a scheduling interval such that the spread of the data and gap inserted across the entire interval is pseudorandom.

In one embodiment the scheduling intervals on different nodes in the ring network are synchronous with respect to each other.

In one embodiment the scheduling intervals on different nodes in the ring network are asynchronous with respect to each other.

In one embodiment, unused wavelength allocations can be carried from one scheduling interval to the next scheduling interval, if demand for wavelength at that source still exists at the end of interval, to improve the wavelength access of at least one node in the network.

In one embodiment insertion of data is random within a scheduling interval and completely deterministic over a complete interval such that the ratio of data to gaps always equals the desired bandwidth allocation.

In one embodiment data and gap amounts over a scheduling interval are configured to be different such that the ratio of data to gap over the interval is a desired amount of bandwidth.

In another embodiment when large amounts of gaps are required and a small amount of data is required the randomness can be changed to make it more uniform over a scheduling interval by dividing the interval into smaller segments and ensuring there is at least one data burst in each interval. This reduces jitter to a sub-division of the interval rather than the complete interval.

Other schemes such as the one described above can be devised to change the latency and jitter over time for different amounts of requested bandwidth, which is in essence adjusting the random profile of the generation of gaps but keep them unsynchronised across all the nodes. This can be done for example by using random sequences that have low cross-correlation but which distribute the data evenly or close to evenly across a set time interval.

In another embodiment of the invention there is provided a control system, suitable for an optical fibre network, said control system comprises means to control wavelength to be transmitted on the network in a burst transmit mode between two or more nodes over a scheduling interval; and said control means comprises a random generator for generating a plurality of random gap intervals spread over the scheduling interval, said gap intervals allow for wavelengths from different nodes to transmit wavelengths in said gaps to achieve a fair access to bandwidth and fair latency in the network.

It will be appreciated that fair latency is achieved by injecting latency into further upstream locations accessing that wavelength. That is, upstream nodes that could access a wavelength un-contended are constrained by the insertion of gaps resulting in their average latency equalling that of downstream nodes competing for access to the same wavelength.

The principle of the invention can also be extended to provide weighted fair access to ring bandwidth, such that different ratios of bandwidth can be guaranteed between sources and destinations independent of their comparative position on the ring.

In a further embodiment of the invention there is provided a method for a burst transmission optical fibre wavelength routed ring network comprising a plurality of nodes on a network ring where each node can drop and add a wavelength, said method comprising the steps of
controlling the wavelength to be transmitted on the network ring in a burst transmit mode from each node over a scheduling interval; and
generating a plurality of random gap intervals spread over the scheduling interval, said gap intervals allow for wavelengths from different nodes to transmit wavelengths in said gaps to achieve a fair access to bandwidth and fair latency in the ring network.

There is also provided a computer program comprising program instructions for causing a computer program to carry out the above method which may be embodied on a record medium, carrier signal or read-only memory.

BRIEF DESCRIPTION OF DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
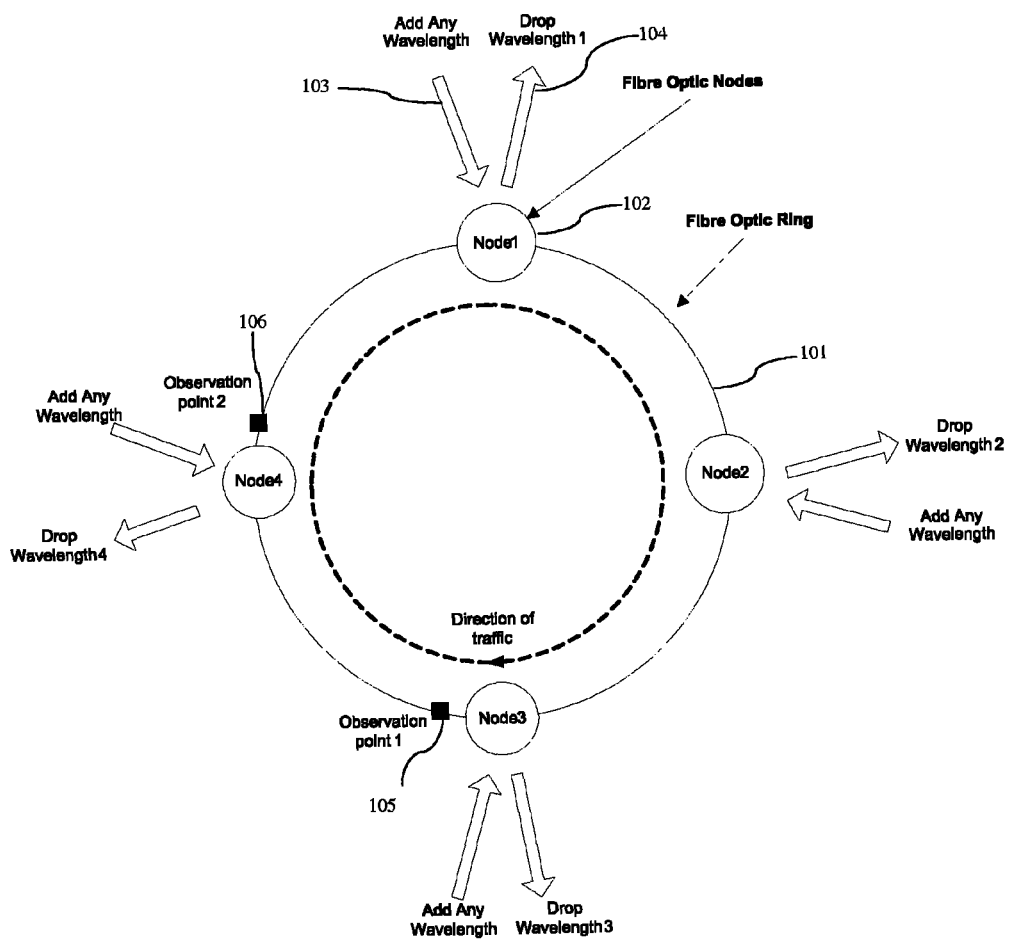
FIG. 1 illustrates a typical optical ring network.

An example of a fibre optic ring network is shown in FIG. 1, where [101] shows a fibre optic ring network with multiple nodes [102] connected by spans of fibre optic cable. Each of the nodes can add a burst light at any wavelength shown as [103] and drops only one specific wavelength shown as [104]. This means that any node can send data to any other node by selecting the required wavelength that is dropped by that node and transmitting a burst at that wavelength. This burst is then added onto the fibre optic ring and dropped at the destination node configured to drop that wavelength. Typically each node will drop a different wavelength so that the wavelength corresponds to a node address.

In this configuration there is only one transmitter and one receiver per node and a data rate of 10 Gbit/s will be used for the maximum transmit and receiver rates throughout the subsequent sections of this document. This means that over any interval of time the maximum capacity of any transmitter or receiver is 10 Gbit/s.

Figures 2, 3:
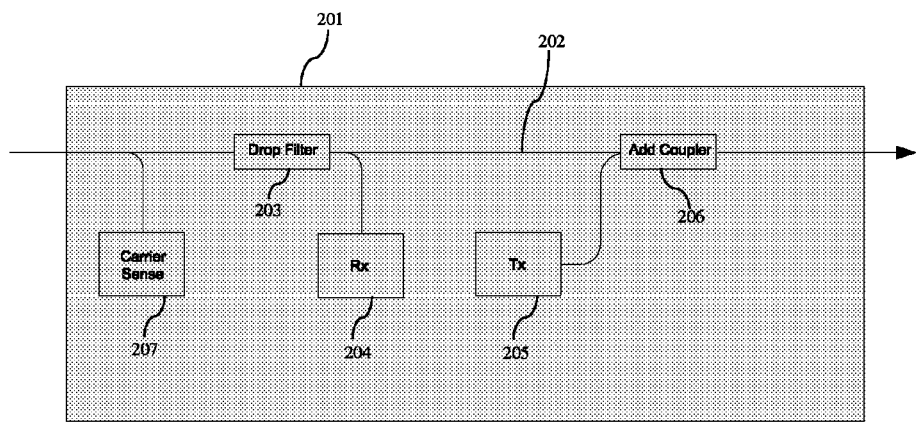
FIG. 2 illustrates a simplified schematic of a node in an optical ring network.
FIG. 3 illustrates a table of bandwidth allocations for an optical ring for different nodes.

FIG. 2 shows a simplified schematic of a node [201] which corresponds to the nodes shown in FIG. 1. A fibre optic [202] is connected to the input and output as shown. A drop filter can be used [203] to drop a specific wavelength to a receiver [204] and allows all other wavelengths to progress through the node to the downstream nodes. It will be appreciated other arrangements for dropping a wavelength are possible, such as a tunable filter or wavelength selective switch. The transmitter [205] generates the bursts by means of a laser and modulator where the laser generates the optical light at the required wavelength for the burst and the modulator imposes the data pattern (typically 1's and 0's) onto the light wave. This is combined with the fibre optic through path [202] by means of an add coupler [206] which combines a percentage of both signals for output from the node [201]. A carrier sense unit [207] is used to determine which wavelengths are currently active on the fibre. This is used in a collision avoidance scheme according to the invention discussed in more detail below.

FIG. 3 shows an example allocation table, where a list of demands for the entire ring can be processed to provide an allowable set of allocations for the ring. The values shown in the table are a percentage of the transmission time, such that, any entry in the table represents the percentage of time in an interval that the source (column) can transmit to the destination (row). As the capacity of each transmitter and receiver is limited to 10 Gbit/s, each row and column must add up to, or be less than 100% of, 10 Gbit/s. This is defined as either doubly stochastic or doubly sub stochastic matrix, that is, $$\sum_{i=0}^{N} r_{i,j} \le 1 \text{ and } \sum_{j=0}^{N} r_{i,j} \le 1,$$

where $r_{i,j}$ is bandwidth allocation ratio from source node i to destination node j and N is the number of wavelengths (nodes) in the ring.

Figure 4:
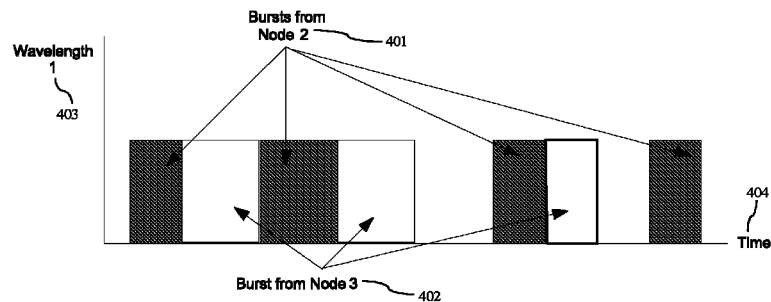
FIG. 4 illustrates optical bursts on an optical wavelength over a scheduling interval.

An example of burst pattern for one wavelength is shown in FIG. 4. Wavelength 1 [403] is shown against time [404], where bursts have been inserted from two nodes [401] and [402] at wavelength 1 for reception at node 1. This pattern can be seen at observation point 1 [105] in FIG. 1, after node 3 has inserted its bursts at wavelength 1. The bursts do not overlap and Node 3 transmits during idle periods for wavelength 1 so that no collisions with Node 2's bursts will occur. A collision avoidance scheme is used here. The carrier sense unit is used, shown in FIG. 2, which splits the incoming signal into each individual wavelength and measures the optical power at each wavelength by means of a photodiode to determine if there are bursts present at each wavelength. If the wavelength is free the node can transmit, if not, then it cannot transmit. The output of the carrier sense unit is compared with the demands and allocations for each wavelength at the node to determine if a burst should be sent. If multiple bursts can be sent the system will determine priority by either longest queue or longest time in the queue or otherwise.

Figure 5:
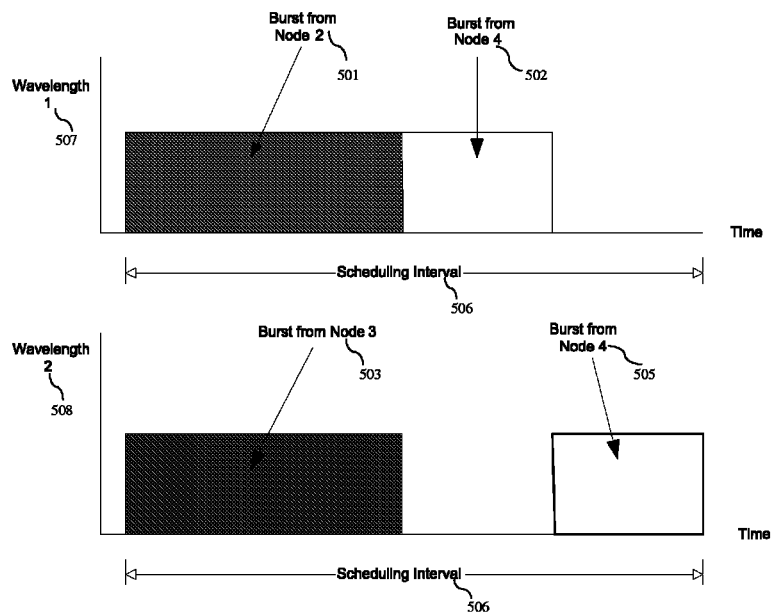
FIG. 5 illustrates optical bursts on two wavelengths where Node 4 cannot achieve a full allocation table.

FIG. 5 shows a possible outcome of the allocations, shown in FIG. 3, where one node is trying to fill in gaps in wavelengths left from other nodes with its own bursts. The example shows the result after node 4 adds its bursts on wavelength 1 [507] and wavelength 2 [508] where bursts are already present from node 2 [501] and node 3 [503]. This pattern could be seen at observation point 2 [106] on FIG. 1. Before node 4 adds its bursts there is 50% capacity free on each wavelength. Node 4 should be able to insert 50% at wavelength 1 and 50% at wavelength 2, but this is not possible as the bursts (and gaps) from node 3 and node 2 are aligned. That is, 50% of the scheduling interval is free in wavelength 1 and wavelength 2, but as they both occur at the same time, and node 4 can only transmit on one wavelength at a time, it spends 25% of the interval at wavelength 1 and 25% of the time at wavelength 2. This means that although node 4 had been given 50% allocation to both wavelengths 1 and 2, which did not exceed their capacity, it actually was only able to access 25% on each. In the case where a queue is overloaded or full, it can send out long bursts that fill a long period of time. There are two problems with this. Firstly, other nodes may align a similar burst with it and as in the case shown in FIG. 5, the downstream node attempting to put bursts on the fibre cannot do so as it must put two bursts on the fibre at the same time to achieve the capacity allocated. Hence the system is not fair in that a node was not able to achieve its desired throughput even though the allocation table was doubly stochastic.

Secondly, the latency from different nodes can be affected by large bursts placed on the ring from other nodes with the result that latency can be affected by loading and traffic conditions in unusual and unfair means. In the example for node 4, there are phases where node 4 cannot transmit for long periods of time and can then transmit a lot together while the upstream node can transmit whenever there is traffic in a queue and it has an allocation.

Example Embodiment of the Invention

Figure 6:
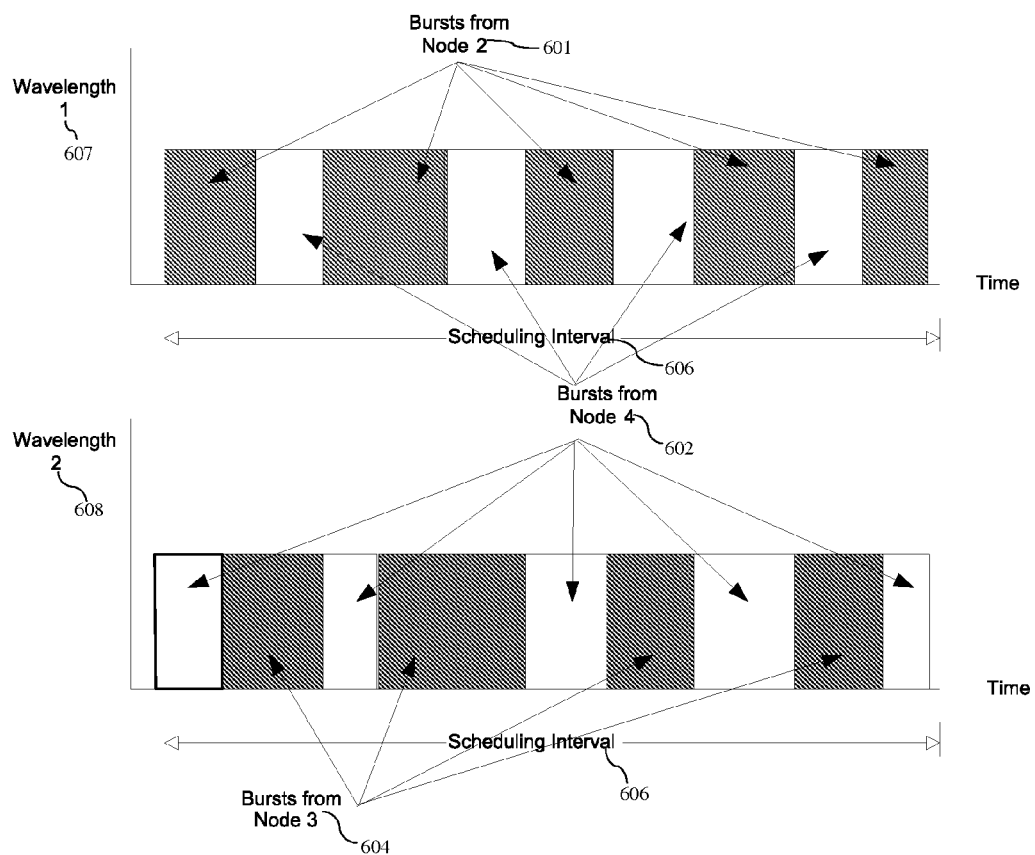
FIG. 6 illustrates optical bursts on two wavelengths where Node 4 can achieve a full allocation table.

FIG. 6 shows the primary aspect of the invention for the same scenario as the previous example. In this case the decision to transmit at all nodes is randomised, so that for periods an upstream node is not allowed to transmit even if it has traffic to send, it has an allocation and the wavelength is free. This has the effect of splitting out the large bursts shown in FIG. 5 into multiple smaller bursts and similarly for node 3. The probability that bursts align is smaller and Node 4 can now fill in the gaps and can achieve more than 50% throughput.

The invention is used at each source to control the insertion and size of gaps for a wavelength by terminating bursts and preventing further transmission at the same wavelength for a determined time. The invention, therefore, controls the size of all bursts and the size of all gaps for all wavelengths at each source node. For the example allocations shown in FIG. 3, the worst case access received by Node 4 is 50%, as shown in FIG. 5. By using the invention at nodes 2 and 3, uniform random insertion of gaps can increase Node 4's access to 75%. This is still not considered fair however because if Node 4 evenly divides the 75% between wavelength 1 and 2, then 37.5% access is still less than the 50% access acquired by Nodes 2 and 3. In order to provide fair access, access at Node 2 and 3 is reduced to a point where equal access is guaranteed across all 3 nodes. Without the invention this point would be at 67%, that is 33% access to Nodes 2 and 3 for wavelengths 1 and 2 respectively. This is to overcome the scenario illustrated in FIG. 5. When the invention is present, access can be increased to 83%. For equivalent scenarios with three or more wavelengths, the benefits provided by the invention are greater. For larger numbers of wavelengths in the worst case scenario a downstream source can be blocked for more than 50% of the time, leading to a further reduction in access to ensure fairness. Conversely when the invention is used for larger numbers of wavelengths, greater than 83% access could be achieved as the probably of the downstream node being blocked is reduced to $1/(2^N)$, where N is the number of wavelengths in the scenario.

The traffic demands in a network can change over time. This means the allocations shown in FIG. 3 will change over time as well. In order to handle this, the invention can be configured to control the burst and gap sizes to meet any allocation. If the allocation is programmed to be x %, then 1-x % gap will be randomly inserted over the interval to space the x % of bursts. In addition to this the invention tracks the current activity on all wavelengths and dynamically adjusts its gap insertion pattern to account for transmissions by upstream nodes at the same wavelength. This allows each node to be independent of what other nodes are doing, that is, if node 2 is allocated 30% on wavelength 3 and uncontended it will transmit bursts for 30% of the interval, randomly separated by gaps for 70% of the interval. If node 1 is also allocated 30% on wavelength 1, Node 2 will monitor the 30% of time that it is blocked by node 1 and automatically reduce its gap insertion to 40% to compensate.

An alternate approach for mixing the RGI's together is to co-ordinate each sources bandwidth (burst) allocation for a wavelength and to reduce each nodes gap allocation by the sum of the upstream gap allocation. This approach is more complex as it requires distribution of all the allocations to all the nodes, whereas the first approach does not require global knowledge.

The RGI can merge all allocations at one source. The group of RGI instances at a single source, one per wavelength, uses the same approach to merge output patterns as it does for all RGI instances access the same wavelength, i.e. when one RGI instance is transmitting, all the others at the same source are blocked and automatically reduce their gap insertion ratio by the amount of time used by the transmitting source.

An example RGI mechanism can work by pseudo-randomly inserting gaps of various sizes into the transmission of bursts from each node in the ring. For simplicity in this example the term pseudo-random will be replaced with random, however the two can be used interchangeably. A PRBS (Pseudo-Random Binary Sequence) generator can be used to generate the random gaps. The sizes of the data bursts are also modulated by the RGI mechanism. This ensures the pathological traffic patterns are replaced with uniformly random patterns. There are two random generators per source-destination pair on the ring, one generator for data (burst) size and one generator for gap size. Therefore, at each source there is one RGI mechanism per destination (wavelength), and each RGI mechanism has two random generators, one for gap size modulation and one for data size modulation.

Due to the pseudo-random nature of the system, some level of synchronisation of patterns at different nodes can still occur. To avoid any long term synchronisation, the seeds used to drive the data/gap insertion patterns are randomised once at the start of each scheduling interval. This prevents any one source-destination pattern being continuously synchronised with another.

An interval or scheduling interval is the time taken to complete a PRBS (Pseudo-Random Binary Sequence) cycle. For example, if PRBS-8 generators were used then an interval would be $(2^8 1)*2$, where there are 2 generators, one for data and one for gap.

The data/gap mechanism is used to start and stop transmission of a single flow (source-destination pair) on the ring. A flow must have a data size greater than 0 to transmit. For each burst transmission the data count is decremented. When not transmitting, the gap count is decremented. When the data count is 0 it is not incremented again by the RGI until the gap count reaches 0. At which point gap count is also incremented again. This means for every new data size determined by the RGI, the flow will also be OFF for at least the gap size as well.

Figure 7:
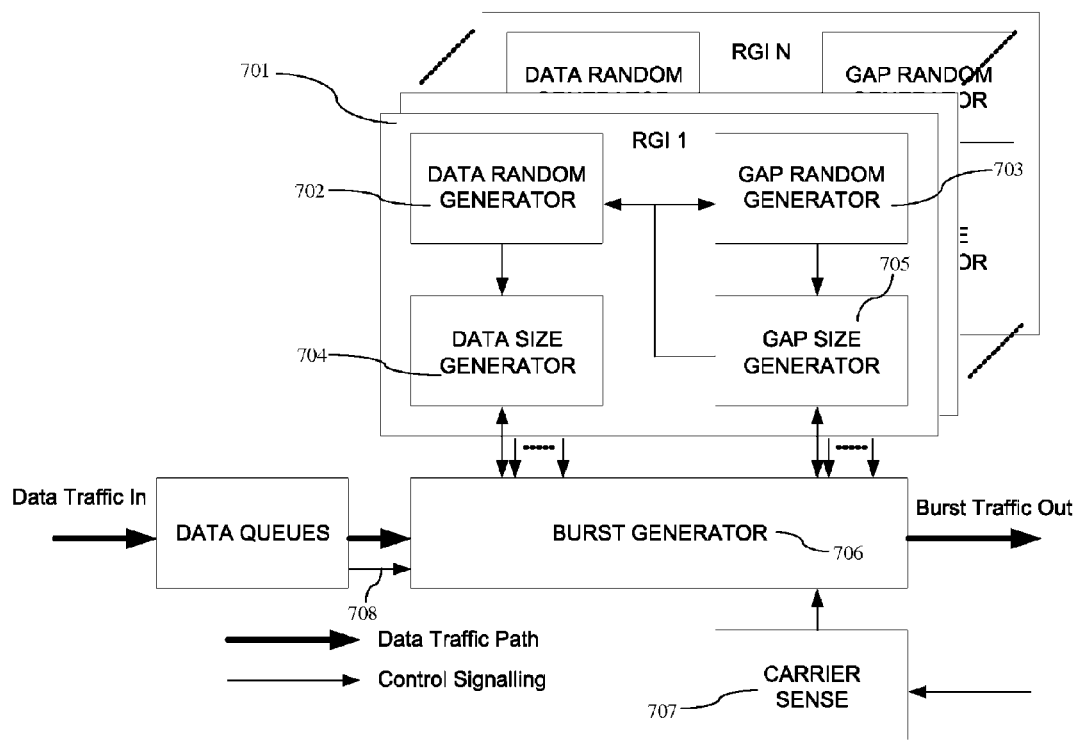
FIG. 7 illustrates a block diagram of an RGI control mechanism employed at a source burst generator.
Figure 8:
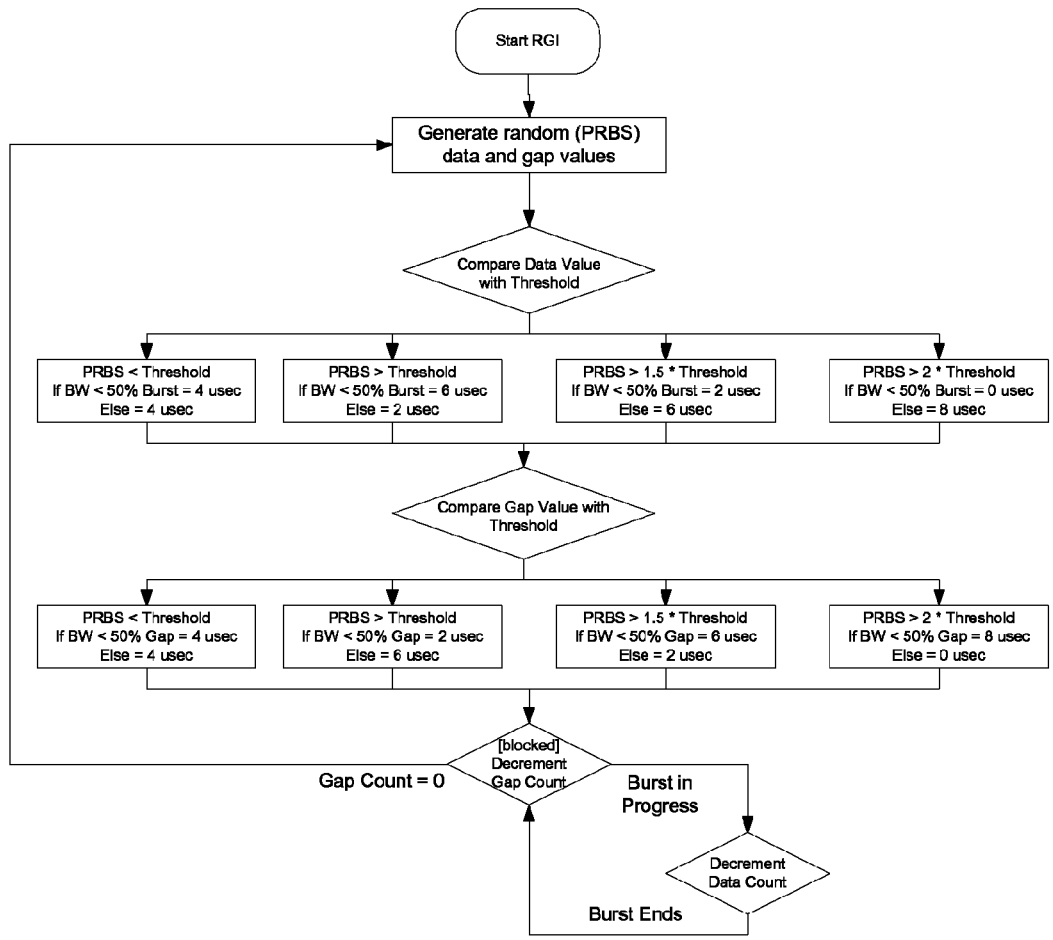
FIG. 8 illustrates a flowchart of the control for a scheduling interval using the PRBS is shown in FIG. 8.

FIG. 7 illustrates a block diagram of an RGI control mechanism employed at a source burst generator. For every wavelength (receiver) that this source can transmit on, there is 1 RGI instance [701] to control access to the wavelength. At the start of each scheduling interval a data random generator [702] and a gap random generator [703] each produce a random number that is passed to a data size generator [704] and gap size generator [705] respectively. These blocks carry out the data and gap size modulation operation described above. A burst generator [706] takes as input the data size and gap size from every RGI instance, one set per wavelength. The burst generator uses the RGI data sizes, carrier sense [707] and the data queue size [708] to decide which wavelength to transmit on next. When the burst is completed the RGI data size for that wavelength is decremented by the burst size. As this transaction has blocked all other wavelengths the gap size of all other RGIs is decremented by the burst size. If the source is completely blocked, because all wavelengths that can be transmitted on are busy as indicated by the carrier sense, then all RGI gap sizes are decremented. When any RGI gap size reaches 0, the data and gap random generators are requested to provide the next random numbers and these are used to calculate the new data and gap sizes, which are added to the current sizes. The flow of control in the RGI instances for a scheduling interval using the PRBS is shown in FIG. 8.

A Linear Feedback Shift Register generated PRBS pattern can be used to generate the data/gap sizes for each burst stream leaving the sources on the ring. For example if a PRBS-8 sequence is used (taps 8,6,5,4), the PRBS-8 8-bit number is compared to a set of thresholds to produce a modulator. The modulator is then added to an average block size parameter to create the required data/gap size. By way of example only, the following settings have been chosen. Block unit=2 us, average block size=2*block unit=4 us, modulator={0, 1, −1, 2, −2}. Note: a −2 equates to that gap/data size being skipped.

The equation for calculating thresholds and associated modulators for the above example is:

For x %<50
    Threshold 1=x*255, Data/Gap Modulator=0
    Threshold 2=Threshold 1+(x/2*255), Data Modulator=−1, Gap Modulator=1
    Threshold 3=Threshold 2+(x/2*255), Data Modulator=1, Gap Modulator=−1
    Else, Data Modulator=−2, Gap Modulator=+2
For x %>50
    Threshold 1=((100−x) 255), Data/Gap Modulator=0
    Threshold 2=Threshold 1+((100×x)/2*255), Data Modulator=1, Gap Modulator=−1
    Threshold 3=Threshold 2+((100−x)/2*255), Data Modulator=−1, Gap Modulator=1
    Else, Data Modulator=2, Gap Modulator=−2

The following example shows how a data/gap modulation for a bandwidth level of 40% (below 50%) is chosen:
    Each node has 3 thresholds for every destination:
    Threshold 1=40% 255 (note: 255==PRBS8 cycle length)
    Threshold 2=Threshold 1+((40%/2)*255)
    Threshold 3=Threshold 2+((40%/2)*255)
    For Data
        PRBS8 value below threshold 1, modulator=0
        PRBS8 value below threshold 2, modulator=−1
        PRBS8 value below threshold 3, modulator=1
        Else, modulator=−2
    For Gap
        PRBS8 value below threshold 1, modulator=0
        PRBS8 value below threshold 2, modulator=1
        PRBS8 value below threshold 3, modulator=−1
        Else, modulator=+2

The following example shows how a data/gap modulation for a bandwidth level of 70% (above 50%) is chosen:
    Each node has 3 thresholds for every destination:
    Threshold 1=300*255
    Threshold 2=Threshold 1+((30%/2)*255)
    Threshold 3=Threshold 2+((30%/2)*255)
    For Data
        PRBS8 value below threshold 1, modulator=0
        PRBS8 value below threshold 2, modulator=1
        PRBS8 value below threshold 2, modulator=−1
        Else, modulator=+2
    For Gap
        PRBS8 value below threshold 1, modulator=0
        PRBS8 value below threshold 2, modulator=−1
        PRBS8 value below threshold 2, modulator=1
        Else, modulator=−2

When gap size is zero, the next PRBS-8 value for data is used to compare against the thresholds and calculate the modulator. This modulator is added to the average block size (2 from above) to produce the modulated block size. The modulated block size is multiplied by the block unit size (2 us). The resulting new data size is added to the current data count. The same process is carried out at the same time for the gap size using its own PRBS generator and threshold parameters.

The PRBS-8 pattern produces a maximum 255 non-repeating cycle sequence. A maximum cycle ensures that all elements are accessed once and only once in each cycle provide the necessary random uniform pattern. This is also independent of where a cycle begins.

When a scheduling interval completes, the PRBS-8 seeds are forced to a new starting value to ensure each RGI mechanism in the entire ring continually changes position every interval. A scheduling interval is completed when the PRBS-8 seed gets back to the original seed value at the start of the interval.

In the context of the present invention 'fair' means that no path or node in the network has preferential treatment over another, in that, for all requests for access to bandwidth, access over a scheduling interval is provided equally across the network.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. In one embodiment the source code is RTL code which can be used to program a FPGA device. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means. In the specification the terms "comprise, comprises, comprised and comprising" or any variation thereof and the terms include, includes, included and including" or any variation thereof are considered to be totally interchangeable and they should all be afforded the widest possible interpretation and vice versa. The invention is not limited to the embodiments hereinbefore described but may be varied in both construction and detail.

The invention claimed is:

1. A burst transmission optical fibre wavelength routed ring network comprising:
a plurality of nodes on a network ring where each node can drop and add a wavelength; control means to control the wavelength to be transmitted on the network ring in a burst transmit mode from each node over a scheduling interval; and said control means comprises a random generator for generating a plurality of gap intervals spread over the scheduling interval, said gap intervals allow for wavelengths from different nodes to transmit wavelengths in said gaps to achieve a fair access to bandwidth and/or fair latency in the ring network.

2. The network as claimed in claim 1 wherein said random generator controls the insertion and size of said gaps for a wavelength by terminating bursts and preventing further transmission at the same wavelength for a determined time.

3. The network as claimed in claim 1 wherein said random generator is configured to control the burst data and gap sizes to meet any allocation by randomly inserting gaps over the scheduling interval.

4. The network as claimed in claim 1 comprising a random gap generator at each node, each generator off-set from each other, such that two different nodes for each scheduling interval in the network will never have the same random data/gap pattern for any wavelength.

5. The network as claimed in claim 1 wherein said control means tracks the current data activity on all wavelengths and dynamically adjusts the gap insertion pattern to account for transmissions by upstream nodes at the same wavelength.

6. The network as claimed in claim 1 wherein the random gap generator inserts gaps pseudo-randomly of various sizes into the transmission of bursts from each node in the ring.

7. The network as claimed in claim 1 wherein sizes of the data bursts are modulated by said random gap generator to ensure pathological traffic patterns are replaced with uniformly random patterns.

8. The network as claimed in claim 1 comprising two random generators per node source-destination pair on the ring, a first random generator for data burst size and a second random generator for gap size.

9. The network as claimed in claim 1 comprising two random generators per node source-destination pair on the ring, a first random generator for data burst size and a second random generator for gap size, wherein the scheduling interval is the time taken to complete at least one PRBS cycle pseudo-random binary sequence.

10. The network as claimed in claim 1 comprising two random generators per noted source-destination pair on the ring, a first random generator for data burst size and a second random generator for gap size, wherein the first random generator generates a first PRBS sequence for data and the second random generator generates a second PRBS sequence for gap size.

11. The network as claimed in claim 8 comprising means to change a PRBS sequence for each scheduling interval.

12. The network as claimed in claim 1 wherein a Linear Feedback Shift Register generates a PRBS-8 pattern and used to generate the data/gap sizes for each burst stream leaving each node.

13. The network as claimed in claim 1 wherein a Linear Feedback Shift Register generates a PRBS-8 pattern and used to generate the data/gap sizes for each burst stream leaving each node and wherein the PRBS-8 8-bit pattern is compared to a set of thresholds to produce a modulator, wherein the modulator is then added to an average block size parameter to create the required data/gap size.

14. The network as claimed in claim 1 wherein each of the nodes can add a burst of light at any wavelength and drops only one specific wavelength, such that any node can send data to any other node by selecting the required wavelength that is dropped by that node and transmitting a burst at that wavelength.

15. The network as claimed in claim 1 wherein each of the nodes can add a burst of light at any wavelength and drops only one specific wavelength, such that any node can send data to any other node by selecting the required wavelength that is dropped by that node and transmitting a burst at that wavelength and wherein said burst is added onto the fibre optic ring and dropped at the destination node configured to drop that wavelength.

16. The network as claimed in claim 1 comprising means for providing allocations across a scheduling interval, and adapted to compensate at a node for the behaviour of a downstream node for data interrupted by upstream data and using available gaps in the scheduling interval to transmit data.

17. The network as claimed in claim 1 comprising means for providing allocations across a scheduling interval, and adapted to compensate at a node for the behavior of a downstream node for data interrupted by upstream data and using available gaps in the scheduling interval to transmit data, wherein if data is blocked at the node said means carry the allocations and random gap availability until the next available gap.

18. The network as claimed in claim 1 wherein unused allocations can be carried from one scheduling interval to the next scheduling interval, if demand for wavelength at that source still exists at the end of interval, to improve the wavelength access of at least one node in the network.

19. The network as claimed in claim 1 wherein the random generator allows for a deterministic amount of data and gap to be generated in a scheduling interval such that the spread of the data and gap inserted across the entire interval is pseudo-random.

20. The network as claimed in claim 1 wherein insertion of data is random within a scheduling interval and completely deterministic over a complete interval such that the ratio of data to gaps always equals the desired bandwidth allocation.

21. The network as claimed in claim 1 wherein data and gap amounts over a scheduling interval are configured to be different such that the ratio of data to gap over the interval is a desired amount of bandwidth.

22. The network as claimed in claim 1 wherein the scheduling intervals on different nodes in the ring network are synchronous with respect to each other.

23. The network as claimed in claim 1 wherein the scheduling intervals on different nodes in the ring network are asynchronous with respect to each other.

24. A control system, suitable for an optical fibre network, said control system comprises means to control wavelength to be transmitted on the network in a burst transmit mode between two or more nodes over a scheduling interval; and said control means comprises a random generator for generating a plurality of random gap intervals spread over the scheduling interval, said gap intervals allow for wavelengths from different nodes to transmit wavelengths in said gaps to achieve a fair access to bandwidth and fair latency in the network.

25. A method for a burst transmission optical fibre wavelength routed ring network comprising a plurality of nodes on a network ring where each node can drop and add a wavelength, said method comprising the steps of controlling the wavelength to be transmitted on the network ring in a burst transmit mode from each node over a scheduling interval; and generating a plurality of random gap intervals spread over the scheduling interval, said gap intervals allow for wavelengths from different nodes to transmit wavelengths in said gaps to achieve a fair access to bandwidth and fair latency in the ring network.

26. A computer program comprising program instructions for causing a computer to perform the method of claim 25.

* * * * *

UNITED STATES PATENT AND TRADEMARK OFFICE
CERTIFICATE OF CORRECTION

PATENT NO. : 8,494,365 B2  Page 1 of 1
APPLICATION NO. : 13/637750
DATED : July 23, 2013
INVENTOR(S) : Tom Farrell et al.

It is certified that error appears in the above-identified patent and that said Letters Patent is hereby corrected as shown below:

On the title page, item (75), should read

-- (75) Inventors: Tom Farrell (IE), Shane O'Neill (IE) --

Signed and Sealed this
Twenty-second Day of October, 2013

Teresa Stanek Rea
*Deputy Director of the United States Patent and Trademark Office*